US012407105B2

(12) United States Patent
Li et al.

(10) Patent No.: US 12,407,105 B2
(45) Date of Patent: Sep. 2, 2025

(54) TRI-BAND ANTENNA MODULE

(71) Applicant: Arcadyan Technology Corporation, Hsinchu (TW)

(72) Inventors: Ting-Ren Li, Hsinchu County (TW); Kuo-Chang Lo, Miaoli County (TW)

(73) Assignee: Arcadyan Technology Corporation (TW)

( * ) Notice: Subject to any disclaimer, the term of this patent is extended or adjusted under 35 U.S.C. 154(b) by 148 days.

(21) Appl. No.: 18/139,332

(22) Filed: Apr. 25, 2023

(65) Prior Publication Data

US 2023/0369765 A1 Nov. 16, 2023

(30) Foreign Application Priority Data

May 16, 2022 (TW) ................................ 111118223

(51) Int. Cl.
*H01Q 5/307* (2015.01)
*H01Q 9/04* (2006.01)

(52) U.S. Cl.
CPC .......... *H01Q 9/0421* (2013.01); *H01Q 5/307* (2015.01)

(58) Field of Classification Search
None
See application file for complete search history.

(56) References Cited

U.S. PATENT DOCUMENTS 6,961,028 B2 * 11/2005 Joy ........................ H01Q 5/371 343/803
11,296,412 B1 * 4/2022 He ........................ H01Q 9/285
2004/0222936 A1 11/2004 Hung et al.
2009/0128439 A1 * 5/2009 Su ........................ H01Q 9/24 343/795
2010/0302111 A1 * 12/2010 Kotaka .................. H01Q 9/285 343/702
2014/0132469 A1 * 5/2014 Wang .................. H01Q 1/2266 343/821
2023/0155296 A1 * 5/2023 Wu ........................ H01Q 1/243 343/702

FOREIGN PATENT DOCUMENTS

TW 200917572 A 4/2009

OTHER PUBLICATIONS

Search report Issued by the EPO on Oct. 13, 2023, 8 pages.

* cited by examiner

*Primary Examiner* — Dameon E Levi
*Assistant Examiner* — Anh N Ho
(74) *Attorney, Agent, or Firm* — Innovation Counsel LLP

(57) ABSTRACT

A tri-band antenna module includes a substrate, a first radiator, a second radiator, and a short-circuit structure. The substrate has a signal feed-in terminal and a ground terminal. The signal feed-in terminal is connected to the first radiator, and the ground terminal is connected to the second radiator. The first radiator includes a first extension block and a second extension block, and the second radiator includes a third extension block and a fourth extension block. The first extension block and the second extension block are separated by a first interval, and the third extension block and the fourth extension block are separated by a second interval. The short-circuit structure is connected between the first extension block and the third extension block, and the short-circuit structure is respectively separated from the first extension block and the third extension block by a first slot and a second slot.

13 Claims, 6 Drawing Sheets

TRI-BAND ANTENNA MODULE

This application claims the benefit of Taiwan application Serial No. 111118223, filed May 16, 2022, the subject matter of which is incorporated herein by reference.

BACKGROUND OF THE INVENTION

Field of the Invention

The invention relates in general to an antenna module, and more particularly to a tri-band antenna module.

Description of the Related Art

Since current electronic products are developing towards light, thin, and small, the miniaturization trend of various circuits in electronic products is designed. With the need to support multi-frequency applications, the antennas in electronic products have to consider the miniaturization design. Especially in the application of broadband networks and multimedia services, the tri-band antenna can provide three resonant modes so that the tri-band antenna can operate in three different resonant frequency bands to cover a broader bandwidth.

However, the traditional tri-band antenna is a three-dimensional antenna, which takes up space due to its large size and complex structure. It is not easy to adjust the frequency required by the antenna. Therefore, the costs for molding and assembling required for the three-dimensional antenna are high, and the three-dimensional antenna has the risk of being easily deformed and needs further improvement.

SUMMARY OF THE INVENTION

The present invention relates to a tri-band antenna module, which can be used in a wireless communication device to support multiple frequency bands.

According to an embodiment of the present invention, a tri-band antenna module is provided. The tri-band antenna module includes a substrate, a first radiator, a second radiator, and a short-circuit structure. The substrate has a signal feed-in terminal and a ground terminal. The signal feed-in terminal is connected to the first radiator, and the ground terminal is connected to the second radiator. The first radiator includes a first extension block and a second extension block, and the second radiator includes a third extension block and a fourth extension block. The first extension block and the second extension block are separated by a first interval, and the third extension block and the fourth extension block are separated by a second interval. The first interval extends from the middle of the substrate to one side along a first direction, the second interval extends from the middle of the substrate to another side along a second direction, and the first direction is opposite to the second direction. The short-circuit structure is connected between the first extension block and the third extension block. The short-circuit structure is respectively separated from the first extension block and the third extension block by a first slot and a second slot.

The above and other aspects of the invention will become better understood with regard to the following detailed description of the preferred but non-limiting embodiment(s). The following description is made with reference to the accompanying drawings.

DETAILED DESCRIPTION OF THE INVENTION

Below in conjunction with the accompanying drawings in the embodiments of the application, the technical solutions in the embodiments of the application are clearly and completely described. Obviously, the described embodiments are part of the embodiments of the application rather than all embodiments. Based on the embodiments in the present application, all other embodiments obtained by the person having ordinary skill in the art on the premise of being obvious belong to the protection scope of the present application. The same/similar symbols represent the same/similar components in the following description.

Figure 1A:
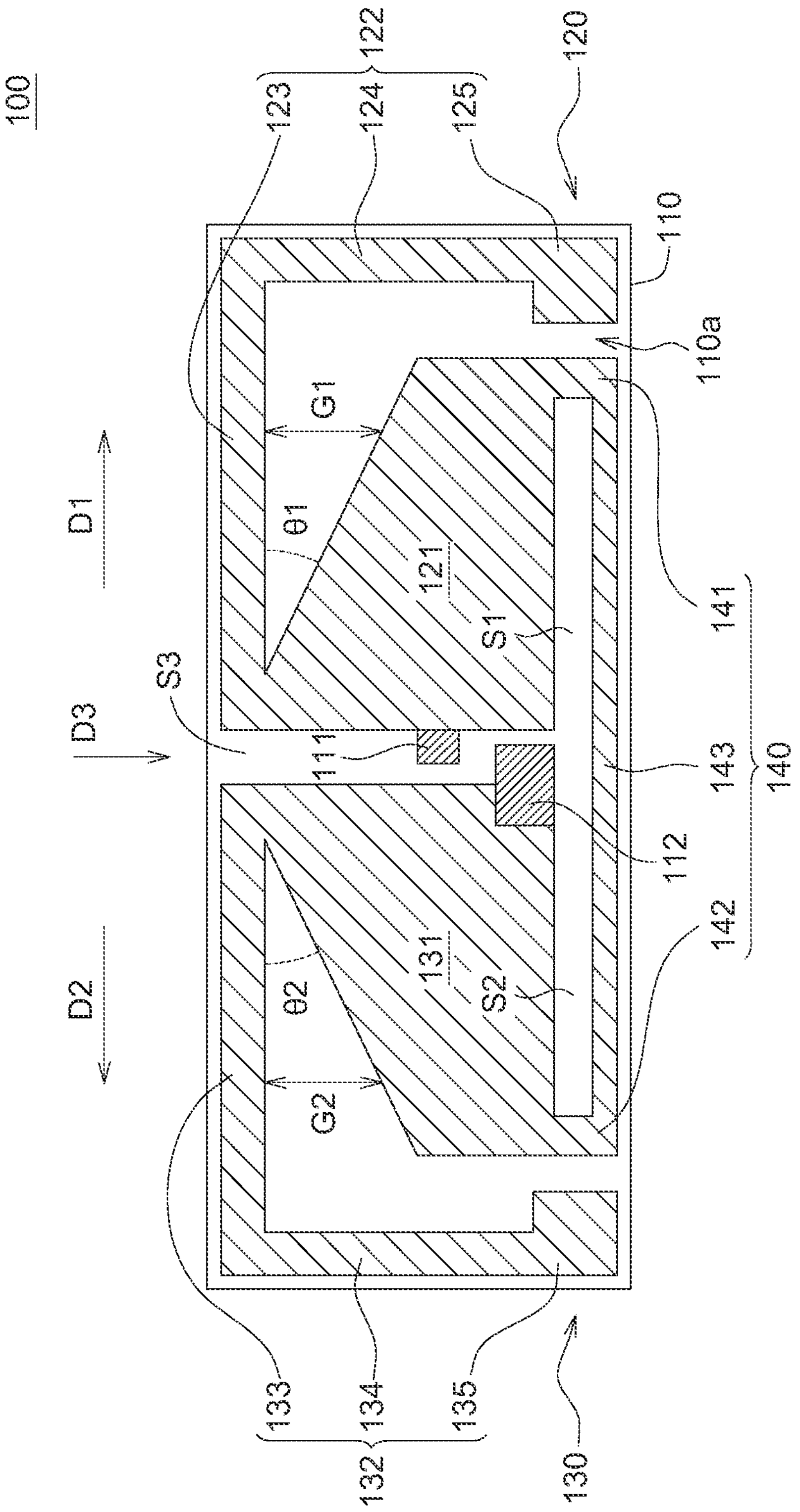
FIG. 1A is a schematic view of a tri-band antenna module according to an embodiment of the present invention.

Referring to FIG. 1A, a schematic view of a tri-band antenna module 100 according to an embodiment of the present invention is provided. The tri-band antenna module 100 includes a substrate 110, a first radiator 120, a second radiator 130, and a short-circuit structure 140. The substrate 110 has a surface 110*a*, and the first radiator 120, the second radiator 130, and the short-circuit structure 140 are all located on the same surface 110*a* of the substrate 110 to form a printed antenna structure.

The first radiator 120 and the second radiator 130 may have a symmetrical structure on the left and right sides to form a symmetrical dipole antenna structure. As shown in FIG. 1A, the first radiator 120 is located on the right half of the substrate 110, and the first radiator 120 includes a first extension block 121 and a second extension block 122. The second radiator 130 is located on the left half of the substrate 110, and the second radiator 130 includes a third extension block 131 and a fourth extension block 132. In this embodiment, the first extension block 121 and the third extension block 131 may be a symmetrical structure on the left and right sides to generate a first resonant frequency and a second resonant frequency, and the second extension block 122 and the fourth extension block 132 may be a symmetrical structure on the left and right sides to generate a third resonant frequency.

In another embodiment, the first radiator 120 and the second radiator 130 may be an asymmetric structure on the left and right sides to provide different working frequency bands, respectively.

Figure 1B:
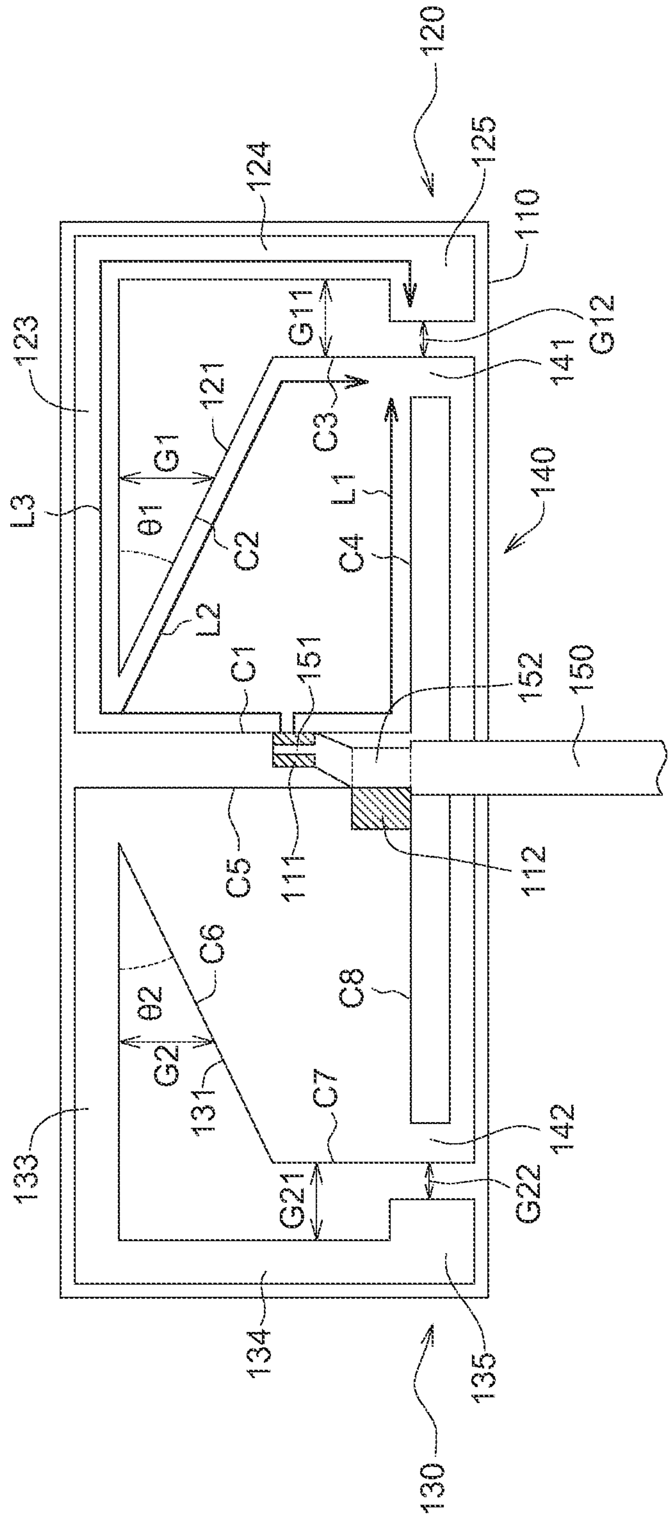
FIG. 1B is a schematic view of the tri-band antenna module in FIG. 1A being connected with a coaxial cable.

In this embodiment, the substrate 110 has a signal feed-in terminal 111 and a ground terminal 112. The signal feed-in terminal 111 is connected to the first radiator 120, and the ground terminal 112 is connected to the second radiator 130. The signal feed-in terminal 111 and the ground terminal 112 are located in a slot between the first extension block 121 and the third extension block 131, and the signal feed-in terminal 111 and the ground terminal 112 are exposed on the surface 110*a* of the substrate 110 for connecting with a cable 150 (such as a coaxial cable 150). As shown in FIG. 1B, the cable 150 is connected to the tri-band antenna module 100. The inner conductive layer 151 and the outer conductive layer 152 of the cable 150 are respectively soldered on the signal feed-in terminal 111 and the grounding terminal 112 of the substrate 110 to transmit or receive radio frequency (RF) signals through the tri-band antenna module 100.

In this embodiment, the first extension block 121 of the first radiator 120 extends from the middle of the substrate 110 to one side along the first direction D1, and the third extension block 131 of the second radiator 130 extends from the middle of the substrate 110 to another side along the second direction D2. The first direction D1 is opposite to the second direction D2. In addition, the cable 150 is used for transmitting a signal to the signal feed-in terminal 111, and the feed-in direction of the signal is substantially perpendicular to the first direction D1 and the second direction D2. When the signal (current) is transmitted to the first extension block 121 and the third extension block 131, respectively, through the signal feed-in terminal 111 and the ground terminal 112, the first extension block 121 and the third extension block 131 can generate a working frequency band of about 5.925 GHZ-7.125 GHz and a working frequency band of about 5.15 GHz-5.85 GHZ, but the present invention is not limited thereto. The return losses of the working frequency band of 5.925 GHZ-7.125 GHZ and the working frequency band of 5.15 GHz-5.85 GHz can be, for example, as low as −10 dB (the smaller the value, the better the signal quality).

In addition, when the signal (current) is transmitted to the second extension block 122 and the fourth extension block 132, respectively, through the first extension block 121 and the third extension block 131, the second extension block 122 and the four extension blocks 132 can generate a working frequency band of about 2.4 GHZ-2.5 GHZ. The return loss of the working frequency band of 2.4 GHZ-2.5 GHz can be as low as −10 dB, for example (the smaller the value, the better the signal quality).

Please refer to FIG. 1B, the first extension block 121 is, for example, a trapezoidal structure, which includes a first side C1, a second side C2, a third side C3, and a fourth side C4. The first side C1 is the long side of the trapezoidal structure, the second side C2 is a hypotenuse of the trapezoidal structure, the third side C3 is the short side of the trapezoidal structure, and the fourth side C4 is the bottom side of the trapezoidal structure. The length of the first side C1 is greater than the length of the third side C3, and the first side C1 is substantially perpendicular to the fourth side C4. In addition, as shown in FIG. 1A, the second extension block 122 includes a first sub-block 123, a second sub-block 124, and a first adjustment block 125. The first sub-block 123 connects with the first extension block and extends from the middle of the substrate 110 to the right side along the first direction D1, the second sub-block 124 is connected to one end of the first sub-block 123 and extends along the third direction D3, and the first adjustment block 125 is connected to one end of the second sub-block 124 and extends along the second direction D2 and adjacent to one side of the short-circuit structure 140. The first adjustment block 125 can be used as an area for adjusting the current coupling and impedance matching of the antenna.

In this embodiment, the second side C2 is connected to the first sub-block 123 of the second extension block 122 and intersects at a first angle θ1. The first angle θ1 is, for example, between 15 degrees and 35 degrees (e.g., about 25 degrees), and the present invention is not limited thereto. Referring to FIG. 1A, the first extension block 121 and the first sub-block 123 are separated by a first interval G1, and the first interval G1 gradually increases along the first direction D1. The third extension block 131 and the third sub-block 133 are separated by a second interval G2, and the second interval G2 gradually increases along the second direction D2.

Referring to FIG. 1B, the third extension block 131 is, for example, a trapezoidal structure, which includes a fifth side C5, a sixth side C6, a seventh side C7, and an eighth side C8. The fifth side C5 is the long side of the trapezoidal structure, the sixth side C6 is a hypotenuse of the trapezoidal structure, the seventh side C7 is the short side of the trapezoidal structure, and the eighth side C8 is the bottom side of the trapezoidal structure. The length of the fifth side C5 is longer than the length of the seventh side C7, and the fifth side C5 is substantially perpendicular to the eighth side C8. In addition, as shown in FIG. 1A, the fourth extension block 132 includes a third sub-block 133, a fourth sub-block 134, and a second adjustment block 135. The third sub-block 133 connects with the third extension block 131 and extends from the middle of the substrate 110 to the left side along the second direction D2, the fourth sub-block 134 is connected to one end of the third sub-block 133 and extends along the third direction D3, and the second adjustment block 135 is connected to one end of the fourth sub-block 134 and extends along the first direction D1 and adjacent to another side of the short-circuit structure 140. The second adjustment block 135 can be used as an area for adjusting antenna current coupling and impedance matching of the antenna. There is a distance G11 between the first extension block 121 and the second sub-block 124 adjacent to each other, and there is a distance G12 between the first extension block 121 and the first adjustment block 125 adjacent to each other, the distances G11 and G12 can be the same or have different values according to the requirements. There is a distance G21 between the third extension block 131 and the fourth sub-block 134 adjacent to each other, and there is a distance G22 between the third extension block 131 and the second adjustment block 135 adjacent to each other. The distances G21 and G22 can be the same or have different values according to the requirements.

In this embodiment, the sixth side C6 is connected to the third sub-block 133 of the fourth extension block 132 and intersects at a second angle θ2. The second angle θ2 is, for example, between 15 degrees and 35 degrees (e.g., about 25 degrees). The first angle θ1 and the second angle θ2 may be the same or different, and the present invention is not limited thereto.

Referring to FIGS. 1A and 1B, the short-circuit structure 140 has a first contact 141, a horizontal extension block 143, and a second contact 142, the first contact 141 and the second contact 142 are located on two ends of the horizontal extension block 143. The first contact 141 is connected to the third side C3 of the first extension block 121 (i.e., the short side of the trapezoidal structure), and the second contact 142 is connected to the seventh side C7 of the third extension block 131 (i.e., the short side of the trapezoidal structure). The length of the horizontal extension section 143 is substantially equal to the distance between the third side C3 of the first extension block 121 and the seventh side C7 of the third extension block 131.

In addition, the short-circuit structure 140 is separated from the first extension block 121 and the third extension block 131 by a first slot S1 and a second slot S2, respectively, and the first slot S1 and the second slot S2 are slots extending along the first direction D1 and the second direction D2, respectively. The extension directions of the first slot S1 and the second slot S2 are substantially perpendicular to the extension direction (i.e., the third direction D3) of a third slot S3 separated between the first radiator 120 and the second radiator 130.

In this embodiment, the first slot S1, the second slot S2, the first distance G1, the second distance G2, and the distances G11, G12, G21, and G22 can be used as an area for impedance matching adjustment of the first resonant frequency, the second resonant frequency and the third resonant frequency of the tri-band antenna module 100. The third slot S3 can be used as an area for adjusting current coupling and impedance matching of the antenna. The width and the size of the above-mentioned slots and distances can be appropriately adjusted according to design requirements.

Figure 2A:
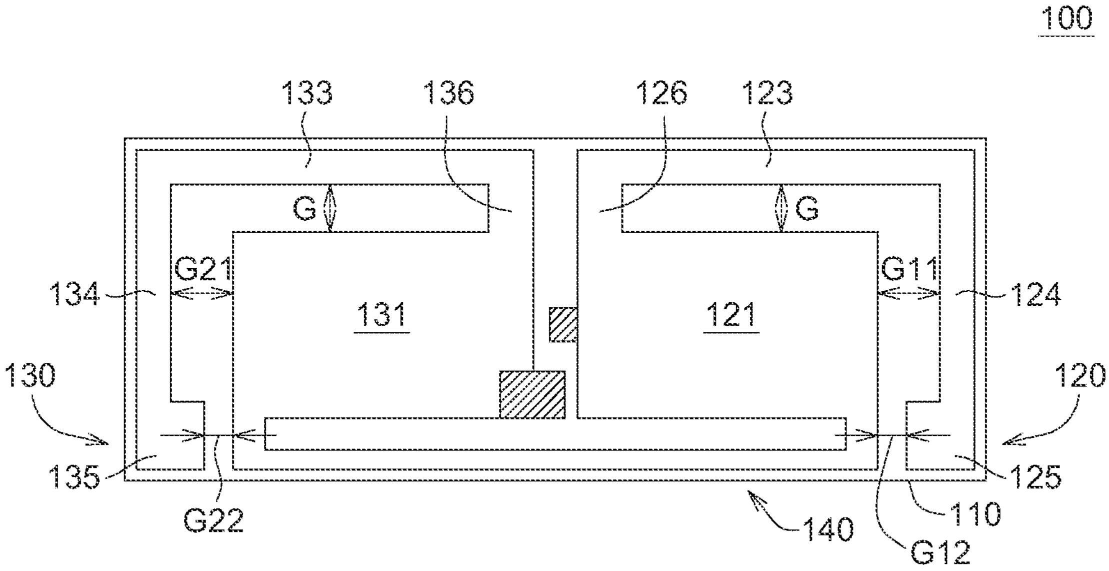
FIGS. 2A and 2B are schematic views of a tri-band antenna module according to another embodiment of the present invention, respectively.
Figure 2B:
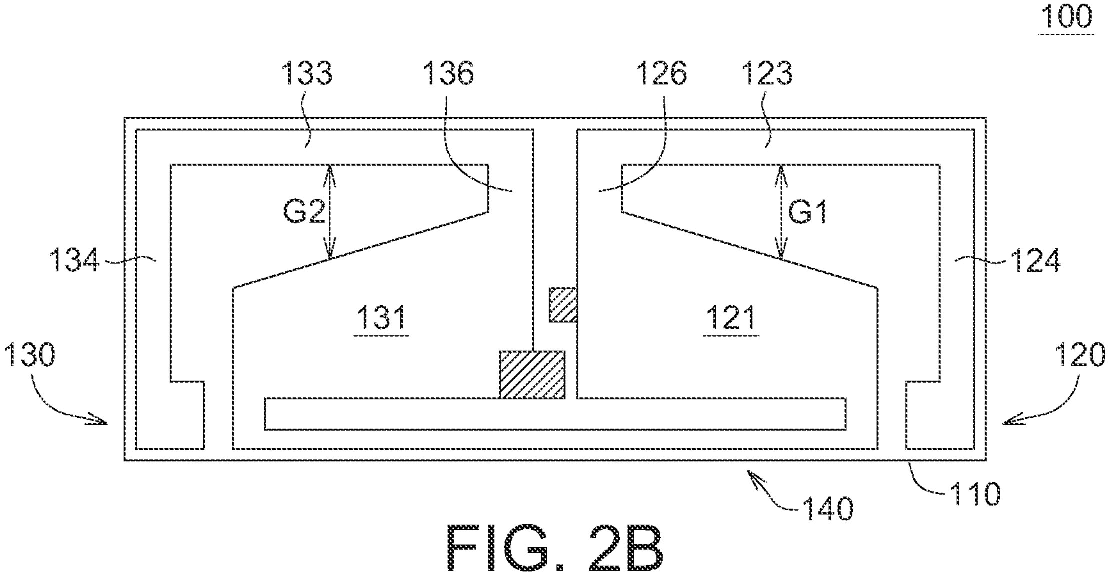

Referring to FIG. 2A and FIG. 2B, schematic views of a tri-band antenna module 100 according to another embodiment of the present invention are respectively illustrated. In FIG. 2A, the first extension block 121, and the third extension block 131 are, for example, rectangular structures. The first extension block 121 and the first sub-block 123 are separated by a fixed distance G, the first extension block 121 and the second sub-block 124 are separated by a distance G11, the first extension block 121 and the first adjustment block 125 are separated by a distance G12. The distances G, G11, and G12 can be the same or have different values according to the requirements. An additional extension block 126 is formed between the first extension block 121 and the first sub-block 123 (approximately one-seventh or one-eighth of the width of the substrate 110). The third extension block 131 and the third sub-block 133 are separated by a fixed distance G, the third extension block 131 and the fourth sub-block 134 are separated by a distance G21, the third extension block 131 and the second adjustment block 135 are separated by a fixed distance G22. The distances G, G21, and G22 can be the same or have different values according to the requirements. An additional extension block 136 is formed between the third extension block 131 and the third sub-block 133, which can also achieve the triple-frequency effect. In FIG. 2B, the first extension block 121, and the third extension block 131 are, for example, trapezoidal structures. There is an extension block 126 and an extension block 136 added between the first extension block 121 and the first sub-block 123 and between the third extension block 131 and the third sub-block 133 (approximately one-seventh or one-eighth of the width of the substrate 110) to adjust the electrical length required by the third frequency band. In addition, in FIG. 2B, there is a first interval G1 between the first extension block 121 and the first sub-block 123, and the first interval G1 gradually increases along the first direction D1. There is a second interval G2 between the third extension block 131 and the third sub-block 133, and the second interval G2 gradually increases along the second direction D2, wherein the first interval G1 and the second interval G2 can be the same or have different values according to requirements. The other distances G11, G12, G21, and G22 are the same as above, and will not be repeated here.

Figure 3A:
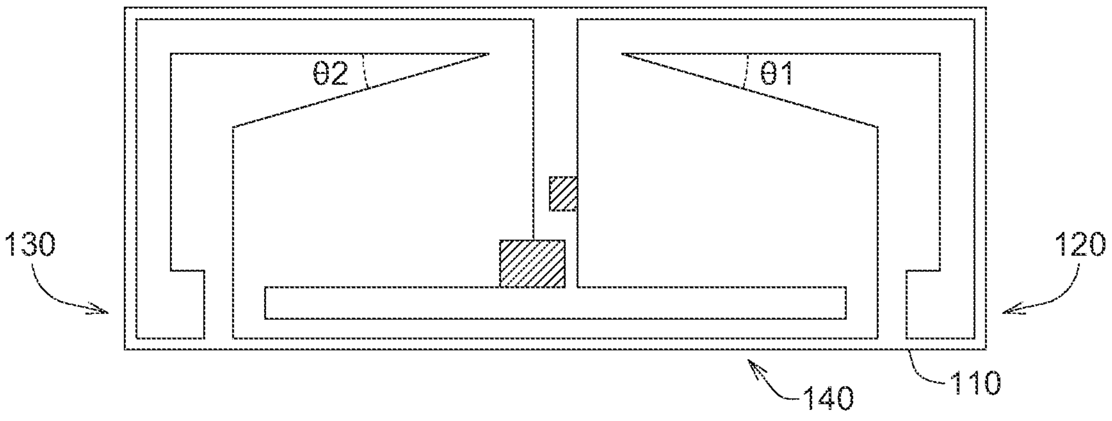
FIGS. 3A and 3B are schematic views of a tri-band antenna module according to another embodiment of the present invention, respectively.
Figure 3B:
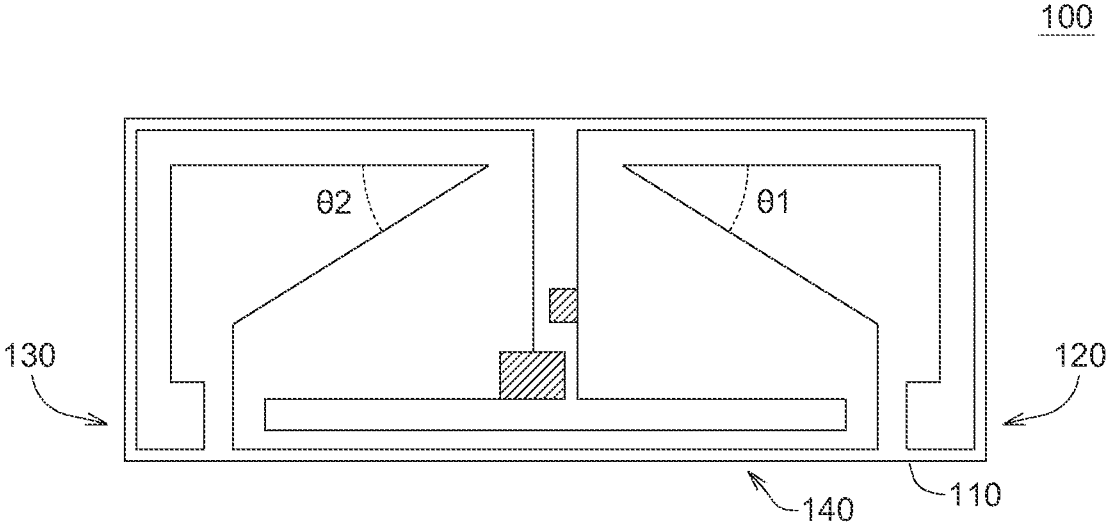

Referring to FIG. 3A and FIG. 3B, schematic views of a tri-band antenna module 100 according to another embodiment of the present invention are respectively illustrated. The differences from the above-mentioned embodiments are that in FIG. 3A, the first angle θ1 and the second angle θ2 are, for example, 15 degrees, in FIG. 3B, the first angle θ1 and the second angle θ2 are, for example, 35 degrees. As the first angle θ1 and the second angle θ2 are adjusted, the corresponding first interval G1 and second interval G2 will also change accordingly, thereby the effect of adjusting the current coupling and impedance matching of the antenna are achieved.

The tri-band antenna module 100 of the present embodiment is a printed tri-band antenna with an easy-to-adjust design for use on a printed circuit board. It is suitable for wireless communication devices and can be easily adjusted and corrected according to product requirements. It can be applied to the wireless communication devices having the operating frequency bands of 802.11a (5150-5850 MHZ), 802.11b (2400-2500 MHz), 802.11g (2400-2500 MHz), 802.11n (2.4 GHz/5 GHz Band), 802.11ac (5 GHz Band), and 802.11ax (2.4 GHz/5 GHZ/6 GHz Band), or can be slightly adjusted in the frequency band and applied to wireless communication devices in other operating frequency bands, for example, it can be applied to ODU (OutDoor Unit), IDU (InDoor Unit) or CPE (Customer Premises Equipment) wireless communication devices.

In this embodiment, the substrate 110 of the tri-band antenna module 100 has, for example, a length (along the D1/D2 directions) and a width (along the D3 direction), the length is about 26.8 mm, and the width is about 10.3 mm. The signal feed-in terminal 111 is located at half width position of the middle of the substrate 110, and its position can be adjusted upward or downward. The signal feed-in terminal 111 is located on the first side C1, and the ground terminal 112 is located on the fifth side C5. After the signal (current) is fed into the signal feed-in terminal 111, a first part of the current reaches the first contact 141 of the short-circuit structure 140 via the first side C1 and the fourth side C4 (i.e., the first path L1 shown in FIG. 1B), a second part of the current reaches the first contact 141 of the short-circuit structure 140 via the first side C1, the second side C2, and the third side C3 (i.e., the second path L2 shown in FIG. 1B), and a third part of the current reaches a position adjacent to the first contact 141 of the short-circuit structure 140 via the first side C1, the first sub-block 123, the second sub-block 124, and the first adjustment block 125 (i.e., the third path L3 shown in FIG. 1B).

The electrical length of the first path L1 depends on the length required by the first radiator 120 to excite the electromagnetic waves of the first frequency band and is approximately equal to a quarter of the wavelength of the first frequency band. The electrical length of the second path L2 depends on the length required by the first radiator 120 to excite the electromagnetic waves of the second frequency band and is approximately equal to a quarter of the wavelength of the second frequency band. The electrical length of the third path L3 depends on the length required by the first radiator 120 to excite the electromagnetic waves of the third frequency band and is approximately equal to a quarter of the wavelength of the third frequency band.

Figure 4:
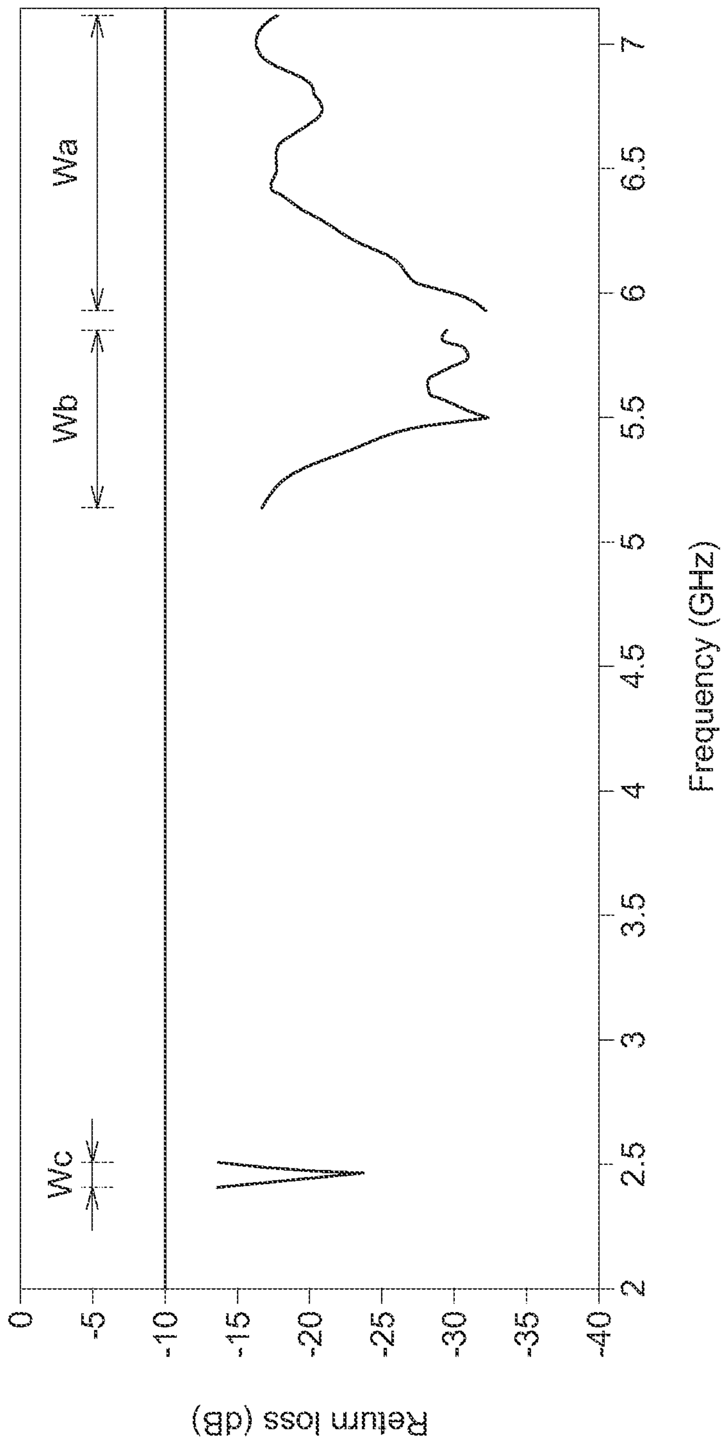
FIG. 4 shows a characteristic diagram of the return loss of the tri-band antenna module of the present invention.
Figure 5:
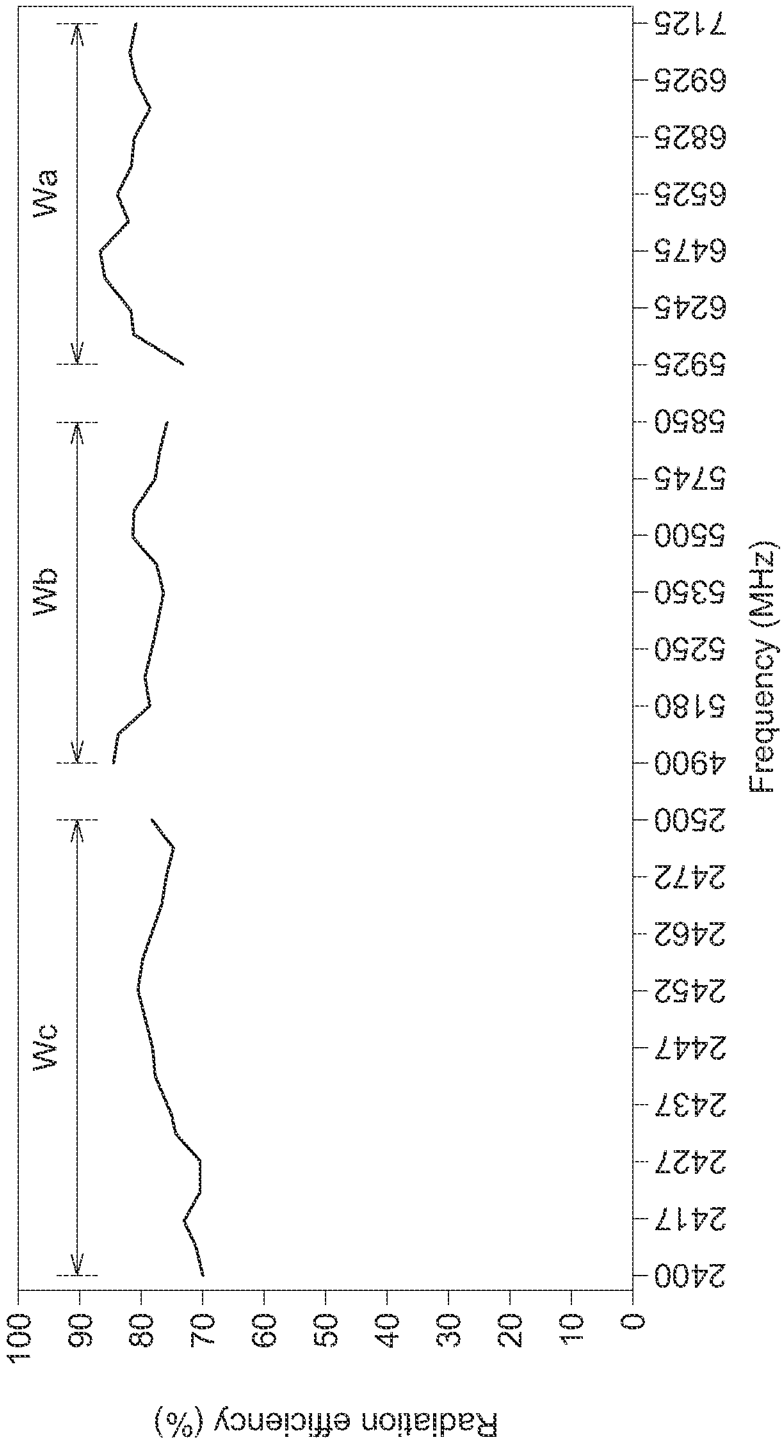
FIG. 5 shows a schematic diagram of the radiation efficiency of the tri-band antenna module of the present invention.

FIG. 4 shows the return loss characteristic diagram of the tri-band antenna module 100, the vertical axis is the return loss value, and the horizontal axis is the frequency (GHz). The first frequency band Wa is, for example, a working frequency band between about 5.925 GHz to 7.125 GHz. The second frequency band Wb is, for example, a working frequency band between about 5.15 GHz to 5.85 GHZ. The third frequency band Wc is, for example, a working frequency band between about 2.4 GHz to 2.5 GHZ. FIG. 4 shows the signal frequency bands and bandwidths in which the tri-band antenna module 100 of the present invention can operate to indicate that the antenna can operate in multiple operating frequency bands with a return loss value of less than-10 dB. FIG. 5 shows a schematic diagram of the radiation efficiency of the tri-band antenna module 100 of the present invention. The antenna radiation efficiencies of the three operating frequency bands (Wa, Wb, Wc) are all greater than 70%, contributing to an overall improvement in antenna bandwidth.

The currently popular fifth-generation mobile network 5G/Sub6G specifically defines the specification for multi-frequency support in terms of bandwidth. In the future, more frequency bands can be provided to integrate, such as Wi-Fi/2.4 GHz+5 GHz+6 GHz or other frequency bands on the same substrate 110. In addition to the continuation of related communication technologies, wireless networks with higher bandwidth and transmission rates are also available and very attractive to users. In terms of signal transmission, the method to feed-in antenna signal is, for example, directly using a 50-ohm (Ω) cable to be soldered on the signal feed-in terminal 111, and the other end of the cable 150 can be freely extended to the RF signal module. In this embodiment, since the system adopts the printed tri-band antenna module 100, the mold manufacturing and assembly cost of the three-dimensional antenna is saved, and the risk of deformation of the three-dimensional antenna can be avoided. The printed tri-band antenna module 100 can be operated on a printed circuit board with a ground plane or matched with the system ground and has the advantage of multiple selectivities. The independent adjustment mechanism of the printed tri-band antenna module 100 can facilitate the system with different applications.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A tri-band antenna module, comprising:

a substrate with a signal feed-in terminal and a ground terminal;

a first radiator;

a second radiator, wherein the signal feed-in terminal is connected to the first radiator, the ground terminal is connected to the second radiator, the first radiator comprises a first extension block and a second extension block, the second radiator comprises a third extension block and a fourth extension block, the first extension block and the second extension block are separated by a first interval, the third extension block and the fourth extension block are separated by a second interval, the first interval extends from a middle of the substrate to one side along a first direction, the second interval extends from the middle of the substrate to another side along a second direction, and the first direction is opposite to the second direction; and a short-circuit structure connected to one end of the first extension block and one end of the third extension block and the short-circuit structure has a horizontal extension block respectively separated from the first extension block and the third extension block by a first slot and a second slot, wherein the short-circuit structure has a first contact connected to the end of the first extension block, and an electrical length between the first contact and the signal feed-in terminal is equal to a quarter of a wavelength of a first frequency band emitted from the first radiator.

2. The tri-band antenna module according to claim 1, further comprising a cable arranged on the substrate, the cable is used to transmit a signal to the signal feed-in terminal and a feed-in direction of the signal perpendicular to the first direction and the second direction.

3. The tri-band antenna module according to claim 1, wherein the first radiator, the second radiator, and the short-circuit structure are integrally formed on the substrate to form a printed antenna structure.

4. The tri-band antenna module according to claim 1, wherein the first radiator and the second radiator are separated by a third slot, and the first radiator and the second radiator form a symmetrical dipole antenna structure.

5. The tri-band antenna module according to claim 4, wherein the third slot extends along a third direction, the first slot and the second slot extend along the first direction and the second direction, respectively, and the third direction is substantially perpendicular to the first direction and the second direction.

6. The tri-band antenna module according to claim 5, wherein the second extension block comprises a first sub-block, a second sub-block, and a first adjustment block, the first sub-block connects with the first extension block and extends along the first direction, the second sub-block connects with one end of the first sub-block and extends along the third direction, the first adjustment block is connected to one end of the second sub-block, extends along the second direction and is adjacent to one side of the short-circuit structure.

7. The tri-band antenna module according to claim 6, wherein the first extension block is a trapezoidal structure, a hypotenuse of the trapezoidal structure at another end of the first extension block near the first sub-block is connected to the first sub-block and intersects with the first sub-block at a first angle, and the first angle is an acute angle.

8. The tri-band antenna module according to claim 7, wherein the short-circuit structure has a first contact, and the first contact is connected to a short side of the trapezoidal structure.

9. The tri-band antenna module according to claim 5, wherein the fourth extension block comprises a third sub-block, a fourth sub-block, and a second adjustment block, the third sub-block connects with the third extension block and extends along the second direction, the fourth sub-block is connected to one end of the third sub-block and extends along the third direction, the second adjustment block is connected to one end of the fourth sub-block, extends along the first direction and is adjacent to one side of the short-circuit structure.

10. The tri-band antenna module according to claim 9, wherein the third extension block is a trapezoidal structure, a hypotenuse of the trapezoidal structure at another end of the third extension block near the third sub-block is connected to the third sub-block and intersects with the third sub-block at a second angle, and the second angle is an acute angle.

11. The tri-band antenna module according to claim 10, wherein the short-circuit structure has a second contact, and the second contact is connected to a short side of the trapezoidal structure.

12. The tri-band antenna module according to claim 1, wherein the first extension block and the third extension block are rectangular structures, and the first extension block and a sub-block of the second extension block are adjacent and separated by a distance, the third extension block and a sub-block of the fourth extension block are adjacent and separated by a distance.

13. The tri-band antenna module according to claim 1, wherein the substrate has a length and a width, and the signal feed-in terminal is located at a half width position in the middle of the substrate.

* * * * *